United States Patent
Lee et al.

(10) Patent No.: US 9,478,799 B2
(45) Date of Patent: Oct. 25, 2016

(54) RECHARGEABLE LITHIUM BATTERY

(71) Applicant: Samsung SDI Co., Ltd., Yongin, Gyeonggi-Do (KR)

(72) Inventors: Soon-Rewl Lee, Yongin (KR); Ick-Kyu Choi, Yongin (KR); Young-Ki Kim, Yongin (KR); Young-Hun Lee, Yongin (KR); Na-Leum Yoo, Yongin (KR); Na-Ri Park, Yongin (KR); Yong-Chul Park, Yongin (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 442 days.

(21) Appl. No.: 13/801,016

(22) Filed: Mar. 13, 2013

(65) Prior Publication Data

US 2014/0050985 A1    Feb. 20, 2014

(30) Foreign Application Priority Data

Aug. 20, 2012   (KR) ........................ 10-2012-0090694

(51) Int. Cl.
| | |
|---|---|
| *H01M 4/36* | (2006.01) |
| *H01M 4/48* | (2010.01) |
| *H01M 4/525* | (2010.01) |
| *H01M 4/50* | (2010.01) |
| *H01M 4/38* | (2006.01) |
| *H01M 4/505* | (2010.01) |
| *H01M 4/587* | (2010.01) |
| *H01M 4/485* | (2010.01) |
| *H01M 4/62* | (2006.01) |

(52) U.S. Cl.
CPC .............. *H01M 4/36* (2013.01); *H01M 4/364* (2013.01); *H01M 4/386* (2013.01); *H01M 4/48* (2013.01); *H01M 4/50* (2013.01); *H01M 4/505* (2013.01); *H01M 4/525* (2013.01); *H01M 4/587* (2013.01); *H01M 4/366* (2013.01); *H01M 4/485* (2013.01); *H01M 4/625* (2013.01); *H01M 2300/004* (2013.01); *Y02E 60/122* (2013.01)

(58) Field of Classification Search
CPC ....... H01M 4/386; H01M 4/50; H01M 4/505
USPC ........................................................ 429/220
See application file for complete search history.

(56) References Cited

U.S. PATENT DOCUMENTS

| | | | |
|---|---|---|---|
| 7,914,930 B2 * | 3/2011 | Sato ........................ | H01M 4/13 29/623.3 |
| 2004/0076882 A1 * | 4/2004 | Hosoya et al. ............... | 429/223 |
| 2006/0099511 A1 * | 5/2006 | Fukushima et al. .......... | 429/232 |
| 2009/0325061 A1 * | 12/2009 | Lim .............................. | 429/163 |

FOREIGN PATENT DOCUMENTS

| | | |
|---|---|---|
| JP | 2003-123740 A | 4/2003 |
| KR | 10-2003-0033492 A | 5/2003 |
| KR | 10-2006-0052502 A | 5/2006 |
| KR | 10-2009-0074429 A | 7/2009 |
| KR | 10-2010-0002695 A | 1/2010 |

OTHER PUBLICATIONS

Korean Office Action dated May 18, 2016 for Korean Patent Application No. KR 10-2012-0090694, which corresponds to subject U.S. Appl. No. 13/801,016.

* cited by examiner

*Primary Examiner* — Basia Ridley
*Assistant Examiner* — James Erwin
(74) *Attorney, Agent, or Firm* — Knobbe Martens Olson & Bear LLP

(57) ABSTRACT

In an aspect, a rechargeable lithium battery including a negative electrode including a silicon-based negative active material is disclosed.

13 Claims, 1 Drawing Sheet

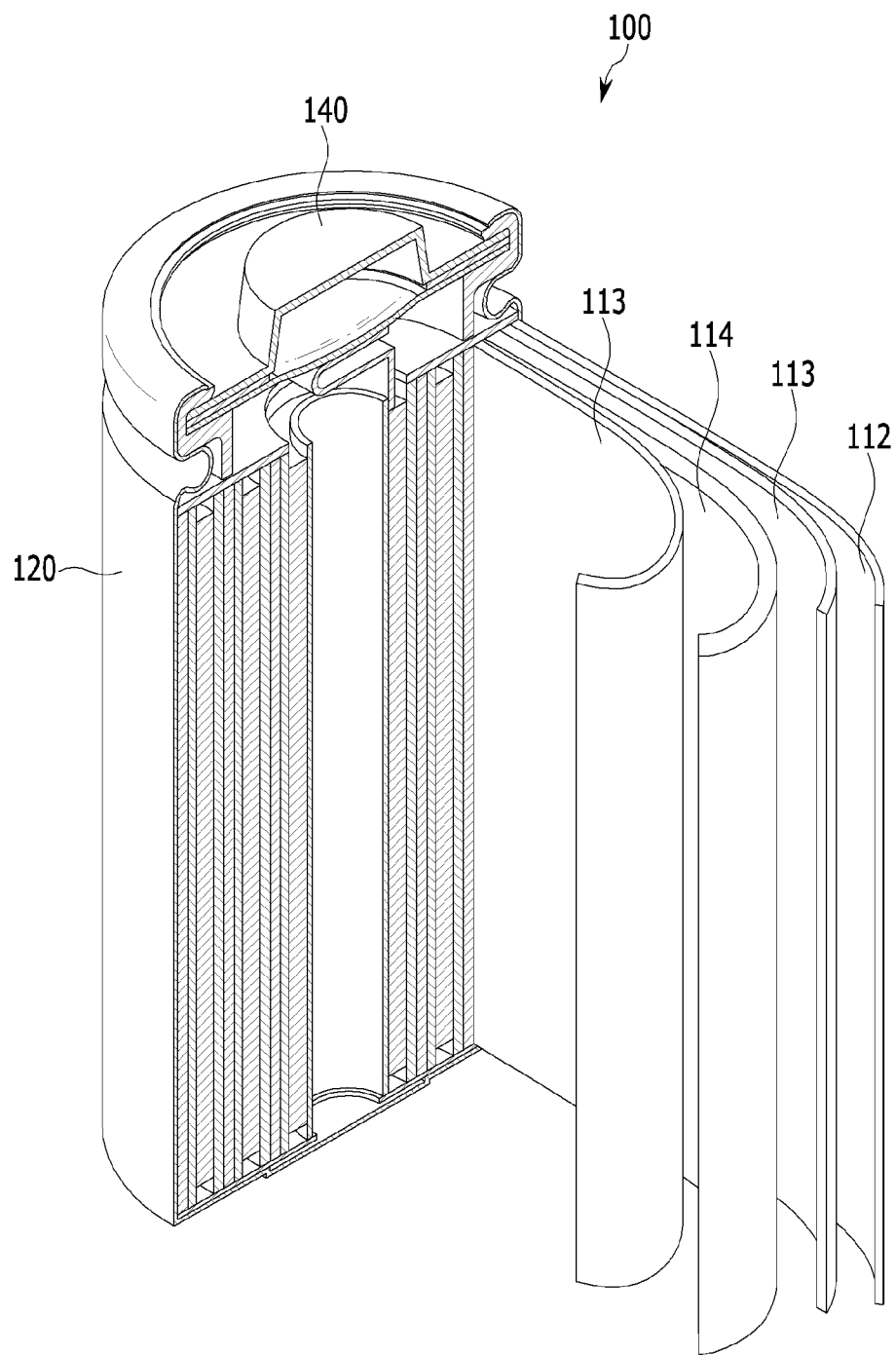

RECHARGEABLE LITHIUM BATTERY

CROSS-REFERENCE TO RELATED APPLICATIONS

This application claims priority to and the benefit of Korean Patent Application No. 10-2012-0090694 filed on Aug. 20, 2012 in the Korean Intellectual Property Office, the disclosure of which is incorporated in its entirety herein by reference.

BACKGROUND

1. Field

This disclosure relates to a rechargeable lithium battery.

2. Description of the Related Technology

Recently, rechargeable lithium batteries have drawn attention as a power source for small portable electronic devices. Rechargeable lithium batteries use an organic electrolyte solution and have twice or more the discharge voltage than that of conventional batteries using an alkali aqueous solution.

As for a positive active material for a lithium rechargeable battery, a lithium-transition element composite oxides being capable of intercalating lithium, such as $LiCoO_2$, $LiMn_2O_4$, $LiNi_{1-x}Co_xO_2$ (0<x<1), and the like, has been investigated. As for a negative active material for a lithium rechargeable battery, various carbon-based materials such as artificial graphite, natural graphite, and hard carbon capable of intercalating and deintercalating lithium ions have been used. Since graphite among the carbon-based materials has a low discharge potential relative to lithium of about −0.2V, a battery using the graphite as a negative active material has a high discharge potential of about 3.6V and excellent energy density. Furthermore, the graphite imparts a long cycle life for a battery due to its outstanding reversibility. However, a graphite active material has a low density (theoretical density: about 2.2 g/cc) and consequently a low capacity in terms of energy density per unit volume when using the graphite as a negative active material.

Further, a battery may swell and thus, decreased capacity, because graphite can react with an electrolyte at a high discharge voltage. In order to solve these problems, an oxide negative active material such as tin oxide, lithium vanadium-based oxide, and the like has been investigated. However, the oxide negative active material may not realize sufficient cell performance.

SUMMARY

Some embodiments provide a rechargeable lithium battery having improved capacity, efficiency, and cycle-life characteristics.

Some embodiments provide a rechargeable lithium battery including a negative electrode, said negative electrode including a silicon-based negative active material and having a discharge profile showing a final inflection point ranging from about 0.3V to about 0.6V.

In some embodiments, the silicon-based negative active material may be included in an amount of about 3 wt % to about 20 wt % based on 100 wt % of the negative active material.

In some embodiments, the silicon-based negative active material may be included in an amount of about 3 wt % to about 5 wt % based on 100 wt % of the negative active material.

In some embodiments, the silicon-based negative active material may be mixed with a carbon-based negative active material.

In some embodiments, the rechargeable lithium battery may further include a positive electrode, said positive electrode including a positive active material having charge and discharge efficiency of less than or equal to about 95%.

In some embodiments, the positive active material may include a first positive active material having charge and discharge efficiency of greater than about 90% and a second positive active material having charge and discharge efficiency of less than or equal to about 90%.

In some embodiments, the first and second positive active materials may be mixed in a weight ratio of about 8:2 to about 4:6.

In some embodiments, the first positive active material may be a lithium cobalt-based oxide.

In some embodiments, the second positive active material may be a lithium nickel cobalt manganese-based oxide.

In some embodiments, the second positive active material may be a compound represented by the following Chemical Formula 1.

$$Li_{1+x}(M1)_yMn_{1-y-z}(M2)_zO_2 \qquad \text{Chemical Formula 1}$$

In Chemical Formula 1, 0≤x≤0.2, 0.4≤y≤0.6, 0≤z≤0.2, M1 may be Ni, or a combination of Ni and at least one metal ion selected from Cr, Fe, Co, Cu, Zr, Ti, and B (boron), M2 may be Co, or a combination of Co and at least one metal ion selected from Al, Ti, Mg, and Zn.

In some embodiments, the second positive active material may have an average particle diameter of about 5 μm to about 15 μm.

In some embodiments, the silicon-based negative active material may include at least one component selected from the group consisting of silicon (Si), a silicon oxide, silicon (Si) coated with conductive carbon on the surface, and a silicon oxide coated with conductive carbon on the surface.

Some embodiments provide a positive electrode, including a first positive active material; a second positive active material, said second positive active material including: a compound represented by the following formula 1

$$Li_{1+x}(M1)_yMn_{1-y-z}(M2)_zO_2 \qquad \text{Chemical Formula 1}$$

wherein, 0≤x<0.2, 0.4≤y≤0.6, 0≤z≤0.2, M1 is Ni, or a combination of Ni and at least one metal ion selected from the group consisting of Cr, Fe, Co, Cu, Zr, Ti, and B (boron), and M2 is Co, or a combination of Co and at least one metal ion selected from the group consisting of Al, Ti, Mg, and Zn; and a current collector. In some embodiments, the second positive active material has an average particle diameter of about 5 μm to about 15 μm.

Some embodiments provide a rechargeable lithium battery, comprising a positive electrode as disclosed and described herein; and a negative electrode as disclosed and described herein. In some embodiments, the negative electrode comprises a silicon-based negative active material. In some embodiments, the silicon-based negative active material is comprised in an amount of about 3 to about 20 wt % based on 100 wt % of a negative active material. In some embodiments, the silicon-based negative active material is comprised in an amount of about 3 to about 5 wt % based on 100 wt % of a negative active material. In some embodiments, the rechargeable lithium battery has a discharge profile showing a final inflection point ranging from about 0.3 to about 0.6V.

The rechargeable lithium battery may have excellent capacity, efficiency, and cycle-life characteristic.

BRIEF DESCRIPTION OF THE DRAWINGS

FIG. 1 is a schematic view showing the structure of a rechargeable lithium battery according to an aspect of the present embodiments.

DETAILED DESCRIPTION

Exemplary embodiments will hereinafter be described in detail. However, these embodiments are exemplary, and this disclosure is not limited thereto.

Some embodiments provide a rechargeable lithium battery including a negative electrode including a silicon-based negative active material and having a discharge profile showing a final inflection point ranging from about 0.3 to about 0.6V. In general, a rechargeable lithium battery has a discharge profile showing an inflection point of more than or equal to two. The final inflection point denotes an inflection point finally appearing before ending a discharge in the discharge profile, that is to say, an inflection appearing right before ending a discharge in the discharge profile.

In some embodiments, the silicon-based negative active material may be used as a high-capacity negative electrode material. A carbon-based material, e.g. graphite, generally used as a negative active material has a limit in realizing a high-capacity rechargeable lithium battery.

However, the silicon-based negative active material has efficiency deterioration due to irreversibility when singularly used and thus, may be mixed with other well-known negative active materials. Accordingly, the negative active material may be used to deliver a balance with a positive active material in terms of capacity and efficiency.

In some embodiments, the rechargeable lithium battery may include a negative electrode including a silicon-based negative active material in an amount of about 3 wt % to about 20 wt % based on 100 wt % of a negative active material. In some embodiments, a rechargeable lithium battery may have the aforementioned discharge profile when the silicon-based negative active material is included in an amount of about 3 wt % to about 20 wt % based on 100 wt % of a negative active material. In some embodiments, the silicon-based negative active material may be included in an amount of about 3 wt % to about 5 wt %.

In some embodiments, the negative electrode for the rechargeable lithium battery may include a mixture of the silicon-based negative active material and a carbon-based negative active material.

Examples of the silicon-based negative active material may include silicon (Si), a silicon oxide, silicon (Si) coated with conductive carbon on the surface, a silicon oxide coated with conductive carbon on the surface, the like, or combinations thereof.

In some embodiments, the carbon-based negative active material is a material that can reversibly intercalates/deintercalates lithium ions and may include any generally-used carbon-based negative active material in a lithium ion rechargeable battery. Examples of the carbon-based negative active material may include crystalline carbon, amorphous carbon, or a combination thereof. In some embodiments, the crystalline carbon may be non-shaped or sheet, flake, spherical, or fiber shaped natural graphite or artificial graphite. In some embodiments, the amorphous carbon may be a soft carbon, a hard carbon, mesophase pitch carbide, fired coke, and the like.

In some embodiments, the rechargeable lithium battery may include a positive electrode including a positive active material having charge and discharge efficiency of about 95% or less in order to have the aforementioned discharge profile. In some embodiments, the positive electrode may include a positive active material having less than or equal to about 90% or less than or equal to about 89%.

As described above, since the negative electrode has lower efficiency than the positive electrode, the additional effect using the positive active material having higher than the predetermined efficiency may not obtained. Accordingly, the rechargeable lithium battery may be designed to first secure efficiency of the positive active material to a degree and then, to improve the efficiency. In some embodiments, the positive active material may have charge and discharge efficiency of less than or equal to about 95% and specifically, less than or equal to about 89% in a rechargeable lithium battery including a negative electrode and having the aforementioned discharge profile. In some embodiments, the positive active material may have charge and discharge efficiency ranging from about 85% to about 95% in a rechargeable lithium battery including a negative electrode and having the aforementioned discharge profile. In some embodiments, the positive active material may have charge and discharge efficiency ranging from about 88% to about 92% in the rechargeable lithium battery including the negative electrode and having the aforementioned discharge profile. In some embodiments, the positive active material may have charge and discharge efficiency ranging from about 88% to about 89%.

For example, the positive active material may not have a charge and discharge efficiency of greater than about 95% but may be designed to suppress an expansion problem of a silicon-based negative active material in a negative electrode. In this way, the positive active material allows to increase the amount of the silicon-based negative active material and thus, increase capacity of a negative electrode, resultantly, realizing a rechargeable lithium battery having improved cycle-life characteristics and the aforementioned discharge profile.

In some embodiments, the positive active material may be prepared by mixing a first positive active material having charge and discharge efficiency of greater than about 90% and a second positive active material having charge and discharge efficiency of less than or equal to about 90%.

In some embodiments, the positive active material may be prepared by mixing a first positive active material having charge and discharge efficiency ranging from about 91% to about 96% and a second positive active material having charge and discharge efficiency ranging from about 82% to about 90%. In general, there are well-known positive active materials having excellent charge and discharge efficiency of greater than about 90%. In some embodiments, the positive active material may include a first positive active material having excellent charge and discharge efficiency, and a second positive active material having charge and discharge efficiency of less than or equal to about 90% and suppressing expansion of a silicon-based negative active material during the charge and discharge and thus, improving cycle-life of a rechargeable lithium battery.

In some embodiments, the first positive active material may be a lithium cobalt-based oxide. In one embodiment, the first positive active material may be a compound represented by the following Chemical Formula A.

$$Li_xCo_{1-y}M_yO_2 \qquad \text{Chemical Formula A}$$

wherein, 1.0≤x≤1.05, 0≤y≤0.02,

M may be selected from Mg, Ti, Al and a combination thereof.

In some embodiments, the second positive active material may be a lithium nickel cobalt manganese-based oxide. In one embodiment, the second positive active material may be a compound represented by the following Chemical Formula 1.

$$Li_{1+x}(M1)_yMn_{1-y-z}(M2)_zO_2 \quad \text{Chemical Formula 1}$$

wherein,

0≤x<0.2, 0.4≤y≤0.6, 0≤z≤0.2,

M1 may be Ni, or a combination of Ni and at least one metal ion selected from Cr, Fe, Co, Cu, Zr, Ti, B, and M2 may be Co, or a combination of Co and at least one metal ion selected from Al, Ti, Mg, and Zn.

In some embodiments, the first and second positive active materials are mixed in a weight ratio ranging from about 8:2 to about 4:6. In some embodiments, the first and second positive active materials are mixed in a weight ratio ranging from about 8:2 to about 6:4 or about 7:3 to about 6:4. The first and second positive active materials within the range may be used to fabricate a positive electrode and thus, a rechargeable lithium battery including the positive electrode and having the aforementioned discharge profile.

In some embodiments, the second positive active material may have an average particle diameter of about 5 μm to about 15 μm.

In some embodiments, the high temperature high voltage characteristics of the rechargeable lithium battery may be improved when the second positive active material has a diameter of about 5 μm to about 15 μm.

For example, the aforementioned lithium nickel cobalt manganese-based oxide may be heat-treated at a temperature ranging from about 990° C. to about 1,100° C., preparing a lump of particles. The lump may be pulverized to particles of the lithium nickel cobalt manganese-based oxide which may be used as a second positive active material. This second positive active material may be used to fabricate a rechargeable lithium battery having cycle-life characteristic improved at high temperatures and high voltages, generating less gas, and having excellent safety.

In some embodiments, the rechargeable lithium battery may further include a separator or an electrolyte, and may be classified into lithium ion batteries, lithium ion polymer batteries, and lithium polymer batteries according to the presence of a separator and the kind of electrolyte used in the battery. In some embodiments, the rechargeable lithium batteries may have a variety of shapes and sizes, and include cylindrical, prismatic, coin-type, or pouch-type batteries, and may be bulk or thin film batteries according to sizes. Structures and fabrication methods for these batteries are well known in the art.

FIG. 1 is an exploded perspective view showing a rechargeable lithium battery according to an aspect of the embodiments. Referring to FIG. 1, the lithium rechargeable battery 100 is formed to have a cylindrical shape and includes a negative electrode 112, a positive electrode 114 and a separator 113 disposed between the negative and positive electrode 112 and 114, an electrolyte (not shown) may be impregnated in the negative and positive electrode 112 and 114 and the separator 113, a battery case 120, and a sealing member 140 sealing the battery case 120. Such a lithium rechargeable battery 100 may be fabricated by sequentially stacking the negative electrode 112, separator 113, and positive electrode 114, spiral-winding them, and housing the wound product in the battery case 120.

In some embodiments, the negative electrode may include a current collector and a negative active material layer formed over the current collector, and the negative active material layer may include a negative active material.

In some embodiments, the negative active material may be as disclosed and described herein.

In some embodiments, the negative active material layer may include a binder. In some embodiments, the negative active material layer may include a binder and a conductive material.

The binder may improve binding properties of negative active material particles with one another and with a current collector. In some embodiments, the binder may include a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxylmethyl cellulose, hydroxypropylmethyl cellulose, methyl cellulose, or alkali metal salts thereof. In some embodiments, the alkali metal may be Na, K, or Li. In some embodiments, the cellulose-based compound may be included in an amount of about 0.1 to about 50 parts by weight based on 100 parts by weight of the negative active material.

In some embodiments, the conductive material may be included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of metal powder or metal fiber including copper, nickel, aluminum, silver, and the like; a conductive polymer such as polyphenylene derivatives; or a mixture thereof.

In some embodiments, the current collector may be a copper foil, a nickel foil, a stainless steel foil, a titanium foil, a nickel foam, a copper foam, a polymer substrate coated with a conductive metal, or a combination thereof.

In some embodiments, the positive electrode includes a current collector and a positive active material layer formed over the current collector.

In some embodiments, the positive active material is as disclosed and described herein.

In some embodiments, the positive active material layer includes a binder and a conductive material.

The binder improves binding properties of positive active material particles with one another and with a current collector. Examples of the binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material may be included to improve electrode conductivity. Any electrically conductive material may be used as a conductive material unless it causes a chemical change. Examples of the conductive material include one or more of natural graphite, artificial graphite, carbon black, acetylene black, ketjen black, a carbon fiber, a metal powder or a metal fiber of copper, nickel, aluminum, silver, and the like, a polyphenylene derivative, and the like.

In some embodiments, the current collector may be Al, but is not limited thereto.

In some embodiments, the negative electrode and positive electrode may be fabricated in a method of mixing the active material, a conductive material, and a binder to prepare an active material composition and coating the composition on a current collector, respectively. In some embodiments, the solvent includes N-methylpyrrolidone and the like, but is not limited thereto.

In some embodiments, the electrolyte includes a non-aqueous organic solvent and a lithium salt.

In some embodiments, the non-aqueous organic solvent serves as a medium for transmitting ions taking part in the electrochemical reaction of a battery.

In some embodiments, the non-aqueous organic solvent may be selected from a carbonate-based, ester-based, ether-based, ketone-based, alcohol-based, or aprotic solvent. The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Examples of the ester-based solvent may include n-methylacetate, n-ethylacetate, n-propylacetate, dimethylacetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, propylpropionate, and the like, and examples of the ketone-based solvent include cyclohexanone, or the like. Examples of the alcohol-based solvent include ethyl alcohol, isopropyl alcohol, or the like. Examples of the aprotic solvent include nitriles such as R—CN (where R may be a C2 to C20 linear, branched, or cyclic hydrocarbon and may include a double bond, an aromatic ring, or an ether bond), amides such as dimethylformamide, dioxolanes such as 1,3-dioxolane, sulfolanes, and the like.

In some embodiments, the non-aqueous organic solvent may be used singularly or in a mixture. When the organic solvent is used in a mixture, the mixture ratio can be controlled in accordance with a desirable battery performance.

In some embodiments, the carbonate-based solvent may include a mixture with a cyclic carbonate and a linear carbonate. The cyclic carbonate and the linear carbonate are mixed together in a volume ratio of about 1:1 to about 1:9. When the mixture is used as an electrolyte, it may have enhanced performance.

In some embodiments, the non-aqueous organic electrolyte may further include an aromatic hydrocarbon-based solvent as well as the carbonate-based solvent. The carbonate-based solvents and the aromatic hydrocarbon-based solvents may be mixed together in a volume ratio of about 1:1 to about 30:1.

In some embodiments, the aromatic hydrocarbon-based organic solvent may be represented by the following Chemical Formula 2.

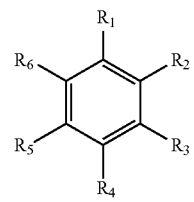

Chemical Formula 2

In Chemical Formula 2, $R_1$ to $R_6$ are each independently selected from hydrogen, a halogen, a C1 to C10 alkyl group, a haloalkyl group, and a combination thereof.

In some embodiments, the aromatic hydrocarbon-based organic solvent may include one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In some embodiments, the electrolyte may further include vinylene carbonate or an ethylene carbonate-based compound represented by the following Chemical Formula 3 to improve cycle life.

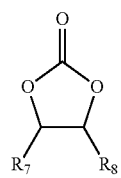

Chemical Formula 3

In Chemical Formula 3, $R_7$ and $R_8$ are each independently hydrogen, a halogen, a cyano (CN) group, a nitro ($NO_2$) group, or a C1 to C5 fluoroalkyl group, provided that at least one of $R_7$ and $R_8$ is a halogen, a nitro ($NO_2$) group, or a C1 to C5 fluoroalkyl group.

In some embodiments, the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is used, use amounts may be adjusted appropriately to improve cycle-life.

The lithium salt is dissolved in an organic solvent, supplies a battery with lithium ions, basically operates the rechargeable lithium battery, and improves transportation of the lithium ions between positive and negative electrodes. Such a lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, and $LiB(C_2O_4)_2$ (lithium bis(oxalato) borate). In some embodiments, the lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

In some embodiments, the separator 113 may include any materials commonly used in the conventional lithium battery as long as separating a negative electrode 112 from a positive electrode 114 and providing a transporting passage for lithium ion. In some embodiments, the separator 113 may have a low resistance to ion transportation and an excellent impregnation for an electrolyte. For example, it may be selected from glass fiber, polyester, polyethylene, polypropylene, polytetrafluoroethylene (PTFE), or a combination thereof. In some embodiments, the separator 113 may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

As used herein, the term "alkyl" refers to a branched or unbranched, or cyclic fully saturated aliphatic hydrocarbon group. In some embodiments, alkyls may be substituted or unsubstituted. Alkyls include, but are not limited to, methyl, ethyl, propyl, isopropyl, butyl, isobutyl, tertiary butyl, pentyl, hexyl, cyclopropyl, cyclopentyl, cyclohexyl, cycloheptyl and the like, each of which may be optionally substituted in some embodiments. In some embodiments, the alkyl may have C1 to C6 carbon atoms. For example, $C_{1-6}$alkyl includes, but is not limited to, methyl, ethyl, propyl, isopropyl, butyl, iso-butyl, sec-butyl, pentyl, 3-pentyl, hexyl, cyclopropyl, cyclobutyl cyclopentyl, cyclohexyl, and the like.

As used herein, "haloalkyl" refers to an alkyl group-, covalently bonded to the parent molecule through a —C— linkage, in which one or more of the hydrogen atoms are replaced by halogen. Such groups include, but are not limited to, chloromethyl, fluoromethyl, difluoromethyl, trifluoromethyl and 1-chloro-2-fluoromethyl, 2-fluoroisobutyl. A haloalkyl may be substituted or unsubstituted.

As used herein, "fluoroalkyl" refers to an alkyl group-, covalently bonded to the parent molecule through a —C— linkage, in which one or more of the hydrogen atoms are replaced by a fluoro group. Such groups include, but are not limited to, fluoromethyl, difluoromethyl, trifluoromethyl and 2-fluoroisobutyl. A fluoroalkyl may be substituted or unsubstituted.

As used herein, "halo" or "halogen" refers to F (fluoro), Cl (chloro), Br (bromo) or I (iodo).

The following examples illustrate the present invention in more detail. These examples, however, are not in any sense to be interpreted as limiting the scope of the invention.

Example 1

Preparation Example 1

Fabrication of Positive Electrode $LiCoO_2$ having charge and discharge efficiency of 95%, and $LiNi_{0.5}Co_{0.2}Mn_{0.3}O_2$ having charge and discharge efficiency of 87% and an average particle diameter of about 5 to 6 μm, were mixed in a composition ratio as provided in the following Table 1 as a positive active material, polyvinylidene fluoride (Solef 6020; SOLVAY Plastics; Brussels, Belgium) as a binder, and carbon black (Denka Co.; New York, U.S.A) as a conductive material are mixed in N-methyl-2-pyrrolidone as a mixing solvent at a weight ratio of 96:2:2 to prepare a slurry, and the slurry was coated on an aluminum current collector having a thickness of 12 μm. The coated aluminum current collector was dried and compressed, fabricating a positive electrode.

Preparation Example 2

Fabrication of Negative Electrode

Graphite and silicon oxide powder (Si x=0.95 to 1.1) (Shinetsu Chemical Co., Ltd.; Tokyo, Japan) were mixed in a composition ratio provided in the following Table 1 as a negative active material and a carboxylmethylcellulose (CMC) binder as a binder, and styrene butadiene rubber-based (SBR) binder as a binder were mixed in water as a mixing solvent at a weight ratio of 98:1:1 to prepare a slurry. Subsequently, the slurry was coated on a copper current collector having a thickness of 12 μm. The coated copper current collector was dried and compressed like the positive electrode, fabricating a negative electrode.

Examples 1 to 4 and Comparative Examples 1 to 6

Fabrication of Battery Cell

The positive electrode according to Preparation Example 1 and the negative electrode according to Preparation Example 2 were used to fabricate a prismatic battery cell.

As an electrolyte solution, a mixture of 1.3M $LiPF_6$ and ethylenecarbonate (EC)/diethylcarbonate (DEC)/propylpropinonate (PP) (3:5:2 volume ratio) was used.

Experimental Example 1

Battery Cell Evaluation

The battery cells were charged under a condition of 0.2 C, CC-CV, and 4.35V and discharged under a condition of 0.2 C and 2.75V and then, evaluated at 0.5 C regarding cycle-life.

The following Tables 1 to 3 provide the evaluation results of the battery cells according to Examples 1 to 4 and Comparative Examples 1 to 6.

TABLE 1

| | Positive electrode [wt % of total amount of 100 wt % of positive active material] | | Negative electrode [wt % of total amount of 100 wt % of negative active material] | | Cycle-life (%) |
|---|---|---|---|---|---|
| | $LiCoO_2$ | $LiNi_{0.5}Co_{0.2}Mn_{0.3}O_2$ | graphite | $SiO_x$ | 100 cycle |
| Example 1 | 80 | 20 | 97 | 3 | 95 |
| Example 2 | 80 | 20 | 95 | 5 | 95 |
| Example 3 | 70 | 30 | 90 | 10 | 94 |
| Example 4 | 60 | 40 | 80 | 20 | 93 |
| Comparative Example 1 | 80 | 20 | 100 | 0 | 90 |
| Comparative Example 2 | 70 | 30 | 100 | 0 | 90 |
| Comparative Example 3 | 90 | 10 | 97 | 3 | 92 |
| Comparative Example 4 | 90 | 10 | 95 | 5 | 90 |
| Comparative Example 5 | 100 | 0 | 97 | 3 | 92 |
| Comparative Example 6 | 100 | 0 | 95 | 5 | 89 |

As shown in Table 1, a battery cell generally maintains about 90% of a cycle-life, but its cycle-life retention rate was improved up to 95% by adjusting the ratio between LCO (Lithium Cobalt Oxide) and NCM (Nickel Cobalt Manganese).

TABLE 2

| | Charge capacity [mAh/g] | Discharge capacity [mAh/g] | Efficiency (%) |
|---|---|---|---|
| Example 1 | 185 | 166 | 90 |
| Example 2 | 185 | 164.5 | 88 |
| Example 3 | 188 | 160 | 85 |
| Example 4 | 191 | 153 | 80 |

TABLE 3

| | Charge capacity [mAh/g] | Discharge capacity [mAh/g] | efficiency (%) |
|---|---|---|---|
| Example 1 | 423 | 378 | 89 |
| Example 2 | 451 | 397 | 88 |
| Example 3 | 522 | 444 | 85 |
| Example 4 | 664 | 539 | 81 |

Table 2 shows charge and discharge capacity and efficiency of the positive electrodes according to Examples 1 to 4. In addition, Table 3 shows charge and discharge capacity and efficiency of the negative electrodes according to Examples 1 to 4.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A rechargeable lithium battery, comprising
   an electrolyte comprising a lithium salt and a non-aqueous organic solvent;
   a negative electrode, said negative electrode comprising:
   i) a current collector; and
   ii) a negative active material layer formed on the current collector, and including a binder and a negative active material, said negative active material consisting of:
      a) a silicon-based negative active material in an amount of about 3 to about 20 wt % based on 100 wt % of the negative active material, and
      b) a carbon-based negative active material, wherein the silicon-based negative active material is at least one component selected from the group consisting of silicon (Si), a silicon oxide, silicon coated with conductive carbon on the surface, and a silicon oxide coated with conductive carbon on the surface, and wherein the carbon-based negative active material is crystalline carbon, amorphous carbon, or a combination thereof; and
   a positive electrode, said positive electrode comprising a positive active material having charge and discharge efficiency of less than or equal to about 95%, wherein the positive active material is a mixture of a first positive active material where the first positive active material is a lithium cobalt-based oxide and a second positive active material where the second positive active material is a lithium nickel cobalt manganese-based oxide having an average particle diameter of about 5 μm to about 15 μm, and the first and second positive active material are mixed in a weight ratio ranging from about 8:2 to about 6:4.

2. The rechargeable lithium battery of claim 1, wherein the silicon-based negative active material is in an amount of about 3 to about 5 wt % based on 100 wt % of the negative active material.

3. The rechargeable lithium battery of claim 1, wherein the silicon-based negative active material is silicon oxide powder ($SiO_x$, x=0.95 to 1.1) and the carbon-based negative active material is graphite.

4. The rechargeable lithium battery of claim 1, wherein the positive active material is a mixture of a first positive active material having charge and discharge efficiency of greater than about 90% and a second positive active material having charge and discharge efficiency of less than or equal to about 90%.

5. The rechargeable lithium battery of claim 4, wherein the first and second positive active material are mixed in a weight ratio ranging from about 7:3 to about 6:4.

6. The rechargeable lithium battery of claim 1, wherein the silicon-based negative active material is at least one component selected from the group consisting of a silicon oxide and a silicon oxide coated with conductive carbon on the surface.

7. The rechargeable lithium battery of claim 1, wherein the first positive active material is $LiCoO_2$.

8. The rechargeable lithium battery of claim 7, wherein the second positive active material is $LiNi_{0.5}Co_{0.2}Mn_{0.3}O_2$.

9. The rechargeable lithium battery of claim 1, wherein the second positive active material is $LiNi_{0.5}Co_{0.2}Mn_{0.3}O_2$.

10. The rechargeable lithium battery of claim 1, wherein the lithium salt is at least one selected from the group consisting of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, and $LiB(C_2O_4)_2$ (lithium bis(oxalato) borate).

11. The rechargeable lithium battery of claim 1, wherein the lithium salt is at least one selected from the group consisting of $LiPF_6$, $LiBF_4$, $LiSbF_6$, $LiAsF_6$, $LiC_4F_9SO_3$, $LiClO_4$, LiCl, LiI, and $LiB(C_2O_4)_2$ (lithium bis(oxalato) borate).

12. The rechargeable lithium battery of claim 1, wherein the lithium salt is at least one selected from the group consisting of $LiPF_6$, $LiBF_4$, $LiClO_4$, LiCl, LiI, and $LiB(C_2O_4)_2$ (lithium bis(oxalato) borate).

13. The rechargeable lithium battery of claim 1, wherein the lithium salt is at least one selected from the group consisting of $LiPF_6$, $LiBF_4$, and $LiB(C_2O_4)_2$ (lithium bis(oxalato) borate).

\* \* \* \* \*